(12) United States Patent
Bernardo de Oliveira et al.

(10) Patent No.: US 12,549,625 B2
(45) Date of Patent: Feb. 10, 2026

(54) MOBILITY-AWARE ITERATIVE SFC MIGRATION IN A DYNAMIC 5G EDGE ENVIRONMENT

(71) Applicant: Dell Products L.P., Round Rock, TX (US)

(72) Inventors: Ana Cristina Bernardo de Oliveira, Rio de Janeiro (BR); Anselmo Luiz Éden Battisti, Niterói-RJ (BR); Débora Christina Muchaluat Saade, Rio de Janeiro-RJ (BR); Evandro Luiz Cardoso Macedo, Rio de Janeiro-RJ (BR); Flavia Coimbra Delicato, Niterói-RJ (BR); Juan Lucas do Rosário Vieira, São Gonçalo-RJ (BR); Julia Drummond Noce, Rio de Janeiro-RJ (BR); Marina Ivanov Pereira Josué, Chiador-MG (BR); Paulo de Figueiredo Pires, Niterói-RJ (BR)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 18/475,101

(22) Filed: Sep. 26, 2023

(65) Prior Publication Data

US 2025/0106277 A1    Mar. 27, 2025

(51) Int. Cl.
*G06F 15/173* (2006.01)
*H04L 67/1008* (2022.01)
(Continued)

(52) U.S. Cl.
CPC ........ *H04L 67/1008* (2013.01); *H04L 67/101* (2013.01); *H04L 67/1012* (2013.01)

(58) Field of Classification Search
CPC ............... H04L 67/1008; H04L 67/101; H04L 67/1012; H04L 67/52; H04L 41/0897; H04L 12/4633; H04L 41/40; H04L 67/535
See application file for complete search history.

(56) References Cited

U.S. PATENT DOCUMENTS

2019/0200271 A1* 6/2019 Agrawal ....... H04W 36/008375
2019/0373101 A1* 12/2019 Dotan-Cohen .. G06Q 10/06314
(Continued)

FOREIGN PATENT DOCUMENTS

CN           109617811 A   *   4/2019    ......... H04L 41/5054

OTHER PUBLICATIONS

Yang et al. "Recent advances of resource allocation in network function virtualization." IEEE Transactions on Parallel and Distributed Systems 32.2 (2020): 295-314.
(Continued)

*Primary Examiner* — Suraj M Joshi
*Assistant Examiner* — Hao H Nguyen
(74) *Attorney, Agent, or Firm* — Workman Nydegger

(57) ABSTRACT

One example method includes predicting a next expected position of the user in a communication network, determining that an SFC request by the user must be migrated from a current node in order to resolve a performance problem of services in the SFC, determining which VNFs of the SFC should be migrated to resolve the performance problem, determining a best migration plan for the VNFs for resolving the identified performance problem, and the best migration plan includes a migration path with a shortest migration delay, finding, in a service chain path identified in the best migration plan, one or more candidate target nodes for migration of the VNFs, and identifying a target node with adequate resources to support the VNFs, and migrating the
(Continued)

VNFs from the current node to the target node with the adequate resources.

20 Claims, 8 Drawing Sheets

(51) Int. Cl.
  *H04L 67/101* (2022.01)
  *H04L 67/1012* (2022.01)

(56) References Cited

U.S. PATENT DOCUMENTS

| | | | |
|---|---|---|---|
| 2020/0314693 A1* | 10/2020 | Xu | H04W 28/088 |
| 2021/0091994 A1* | 3/2021 | Meirosu | H04W 4/24 |
| 2021/0185147 A1* | 6/2021 | Sugisono | H04L 67/1095 |
| 2021/0243278 A1* | 8/2021 | Sugisono | H04L 67/34 |
| 2022/0052915 A1* | 2/2022 | Estevez | H04L 67/1031 |
| 2022/0278931 A1* | 9/2022 | Sugisono | H04L 45/745 |
| 2024/0114069 A1* | 4/2024 | Feng | H04L 67/146 |
| 2024/0160189 A1* | 5/2024 | Sethi | G05B 19/41865 |
| 2025/0004818 A1* | 1/2025 | Cai | G06F 9/45558 |

OTHER PUBLICATIONS

Benkacem et al. "Optimal VNFs Placement in CDN Slicing over Multi-Cloud Environment," IEEE J. Sel. Areas Commun., vol. 36, No. 3, pp. 616-627, 2018.

Reyhanian et al. "Joint Resource Allocation and Routing for Service Function Chaining with In-Subnetwork Processing," ICASSP 2020— 2020 IEEE Int. Conf. Acoust. Speech Signal Process., pp. 4985-4989, 2020.

Zhao et al. Mobile-aware service function chain migration in cloud-fog computing. Future Generation Computer Systems, 96, 591-604. 2019.

Liang et al. Low-latency service function chain migration in edge-core networks based on open Jackson networks. Journal of Systems Architecture, 124. 2022.

Ma et al. Mobility-Aware and Delay-Sensitive Service Provisioning in Mobile Edge-Cloud Networks. IEEE Transactions on Mobile Computing, 21(1), 196-210. 2022.

Abu-Ghazaleh et al. "Application of mobility prediction in wireless networks using markov renewal theory." IEEE Transactions on Vehicular Technology 59.2 (2009): 788-802.

* cited by examiner

MOBILITY-AWARE ITERATIVE SFC MIGRATION IN A DYNAMIC 5G EDGE ENVIRONMENT

FIELD OF THE INVENTION

Embodiments of the present invention generally relate to the positioning of services to support mobile devices operating in an edge environment. More particularly, at least some embodiments of the invention relate to systems, hardware, software, computer-readable media, and methods, for anticipating the movement of users and estimating the impact of their mobility on a service SLAs compliance, and proactively triggering a service migrations procedure when needed.

BACKGROUND

An SFC is composed of a set of chained VNFs that together provide a full-fledged service to a user. The SFC migration problem involves selecting the VNFs of the chain that must be moved to different and suitable nodes with the goal of maintaining, or improving, the QoS (quality of service) metric of the service when performance issues are identified. The SFC migration must be fast, effective and use the available resources efficiently. Meeting these requirements is not a trivial task.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
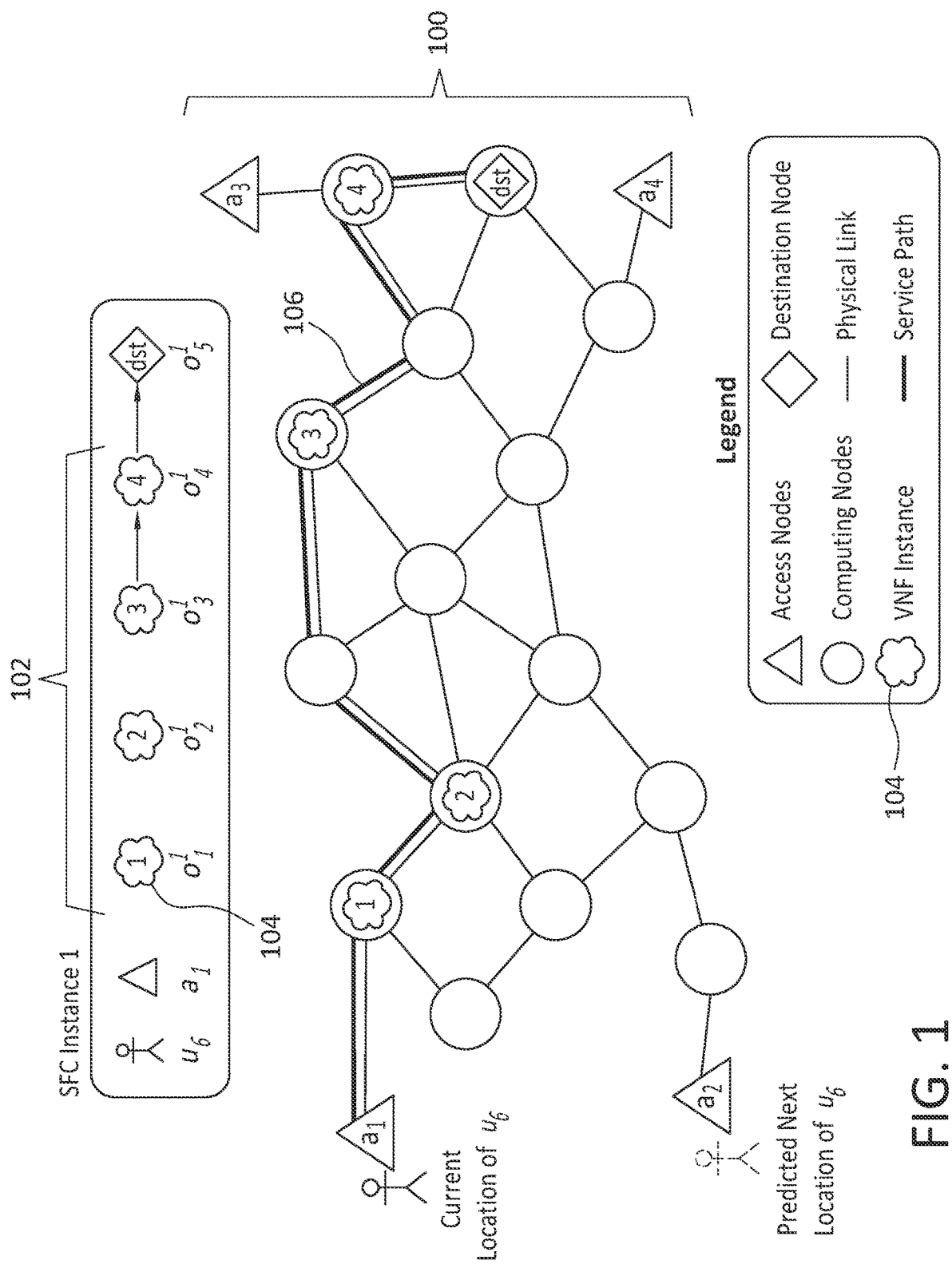
FIG. 1 discloses aspects of an SFC instance at the underlying infrastructure according to one example embodiment.

Embodiments of the present invention generally relate to the positioning of services to support mobile devices operating in an edge environment. More particularly, at least some embodiments of the invention relate to systems, hardware, software, computer-readable media, and methods, for anticipating the movement of users and estimating the impact of their mobility on a service SLAs compliance, and proactively triggering a service migration procedure when needed.

One example embodiment of the invention comprises a proactive and iterative SFC (service function chain) migration strategy to address the performance impact caused by the mobility of a user, such as a mobile communication device for example, in an operating environment. An embodiment may anticipate the movement of users and estimates the impact of their mobility on the SLA (service level agreement) compliance of the service, proactively triggering a service migration procedure when needed. An embodiment may decide which VNFs (virtual network functions) of the SFC should be migrated and which nodes will host the migrating VNFs, fulfilling service, resource and migration constraints while maintaining a low migration cost. An embodiment may also consider the dynamic nature of the edge environment in which other SFC placement and migrations might be occurring when an SFC is being migrated, which also introduces new challenges related to the availability and concurrency of resources required for migration.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an embodiment may proactively identify the impact of user mobility on the performance of SFCs then in execution, triggering service migrations whenever it is necessary. As another example, an embodiment may identify a fast and low-cost SFC migration plan with suitable recipient nodes and migration paths and execute the migration procedure to reduce the impact of user mobility on service performance. Various other advantages of one or more embodiments of the invention will be apparent from this disclosure.

A. CONTEXT FOR AN EXAMPLE EMBODIMENT OF THE INVENTION

An SFC is composed of a set of chained VNFs that together provide a full-fledged service to the user. The SFC migration problem involves selecting the VNFs of the chain that must be moved to different and suitable nodes with the goal of improving the QoS (quality of service) metric of the service when performance issues are identified. Thus, an example embodiment of the invention operates to migrate one or more VNFs to cope with the impact introduced by user mobility, where a user might move to another location and use an access point further from the service in execution.

The SFC migration must be fast, effective and use the available resources efficiently. Meeting these requirements is not a trivial task for several reasons. First, there are many resource allocation constraints to the problem that must be satisfied when selecting the suitable nodes to receive the migrating VNFs. These constraints include finding candidate nodes that have the necessary resources available and whose new service path—the path that will traverse these new nodes receiving the migrating VNFs—must satisfy the delay requirements of the service, without violating the established SLA. Second, decisions related to where to move the VNFs should also consider the migration costs, in terms of resource utilization and time required to migrate the necessary VNFs. These decisions include migrating only the VNFs that have the highest impact on the service performance, and selecting the fastest path available to transfer the migration data from the previous node to the target node. Furthermore, these decisions must also be made in a dynamic environment where available resources are subject to change due to other migrations that might be occurring or SFC placement procedures, where resources will be used to deploy new services in the edge nodes. Additionally, when multiple VNFs of an SFC must be migrated to solve the performance issue, the migration decision of a VNF may also be impacted by the decision made to the previous migrating VNF.

Thus, an embodiment of the invention comprises an iterative approach to address the SFC migration problem. Such an embodiment may address two challenges: [1] the need to proactively identify the impact of user mobility on the performance of SFCs in execution, triggering services migrations whenever it is necessary; and [2] the need to find a fast and low-cost SFC migration plan with suitable recipient nodes and migration paths and execute the migration procedure to reduce the impact of user mobility on service performance. These challenges are addressed in the following sections.

A.1 Proactively Identify Performance Issues Caused by User Mobility on Running Services In the 5G edge environment, for example, users usually access services and applications using mobile devices such as, for example, mobile phones, tablets, laptops, and autonomous vehicles of various types. During the SFC lifespan, the user being serviced might move from one location to another, changing the access node used to access the executing service. These changes require the reconfiguration of the path connecting the user to the service, which results in latency variations that might violate a service maximum delay, such as may be defined in the service SLA. Avoiding SLA violations may be important to increase the profit of the service provider and assure the user satisfaction. However, maintaining good performance to comply with the SLA is a challenging task under user mobility scenarios. Because a user might change, that is, move, between access nodes at any time, it becomes difficult to immediately move the service closer to the user and seamlessly solve the delay problem introduced by the mobility, since the service migration takes time to complete. A way of circumventing this problem is to anticipate performance issues, triggering migrations in a proactive fashion. However, since the user mobility is one of the major factors that may cause delay issues, it would be necessary to be able to predict the next user movement and estimate whether the service will enter an SLA violation state when the user moves. Mobility prediction is not a straightforward task since users might have different movement patterns. At the same time, a per-user mobility prediction approach may be ineffective considering the amount of historical data available for a user. Therefore, what is needed is to find a way of predicting user movements that may achieve a balance between general mobility of users in the system and specific mobility patterns of an individual user. Another challenge in this context is the fact that, when multiple user locations are considered, the service location must satisfy not only the current user location but also the predicted locations of the user, which implies additional constraints and a more complex evaluation as to whether a migration must be triggered.

A.2 Find and Execute Migration Plans to Migrate SFCs to Suitable Recipient Nodes An SFC is composed of an ordered set of VNFs. The migration of an SFC may be considered as the equivalent of migrating several VNFs at the same time. In fact, the SFC migration problem shares similarities with the VNF migration, which is a challenging problem by itself. However, because the decision of where to migrate one VNF affects the decision regarding the migration of other VNFs in the chain, the SFC migration introduces several additional challenges to the original VNF migration problem, requiring complex decision-making.

For example, the migration decision algorithm may have to consider the constraints related to the problem of VNF resource allocation. It must look for candidate nodes with enough available resources to host the migrating VNF and link resources that will be used to form the new service path considering the VNF at its new location. Also, the migration decision may need to verify if this new VNF location satisfies the SLA requirements, such as the maximum allowed delay of the service for example.

The SFC migration utilizes resources from the underlying infrastructure to transfer the required data and instantiate VNFs at their location. Thus, the resource usage should be carefully considered by the decision algorithm. One challenge related to this problem is choosing which VNFs of the SFC should be migrated. Migrating the whole chain of VNFs uses more resources and might incur an overhead at the infrastructure, whereas migrating a single VNF of the chain might not be enough to solve the SLA violation issues. Therefore, the decision algorithm must efficiently identify which VNFs of the chain impose a higher delay overhead and migrate only the ones necessary to solve performance problems. To reduce the time interval in which resources are being used by the migration, the decision algorithm must also find a suitable migration path to transfer the VNF's data as fast as possible. This includes avoiding choosing migration paths that share links—to prevent bottlenecks when data of multiple VNFs are transferred using the same network link.

Finally, due to the dynamic nature of the environment, another SFC in the system might be placed or migrated during the migration of an SFC. Therefore, it may also be necessary to take measures to avoid resource concurrency when a migration is occurring, that is, avoid other SFCs in the system to claim the resources needed for the migrating SFC. Also, because several services require maintaining the function state at the VNFs, another challenge is related to properly transferring the state of the VNFs during the migration.

B. OVERVIEW OF AN EXAMPLE EMBODIMENT OF THE INVENTION

The fifth generation of mobile networks (5G) increased the demand for flexibility and stringent QoS to support several new services. To deal with these requirements, the edge computing paradigm supports delay-sensitive applications by allowing data processing at edge nodes, closer to the users. Also, the Network Function Virtualization (NFV) paradigm has been used as a key technology to replace hardware-based functions by a software counterpart, called VNF, that may be instantiated on commodity hardware. The NFV technology virtualizes computing, network, and storage resources, decoupling the functions from proprietary hardware and, thus, providing the required flexibility for on-demand and low-cost service provision in 5G-edge scenarios.

In an NFV environment, services are provided by instantiating an ordered set of VNFs, referred to as SFC, in the underlying NFV Infrastructure (NFVI). The SFC specifies a chain of functions that must be traversed by the application flow in a specific order to provide the required service functionalities. When providing a service, the SLA specifies several QoS requirements that must be satisfied to maintain good performance standards. Therefore, it is expected that the service provider to fulfill the SLA throughout the service duration.

One known approach in the service provision under the context of NFV is the SFC Placement, which involves finding suitable nodes to host the VNFs and instantiating the SFC at them. In this process, it is necessary to evaluate which nodes and network links have the required resources to execute the VNF Instances and transmit the service packets, satisfying the constraints imposed by the service SLAs. Once these nodes are found, the VNFs that will compose the service may be instantiated at the selected nodes and the service path is formed by the network links that will connect the user's access node to the destination node of the service, traversing the chain of VNFs. However, the 5G-Edge environment has a dynamic and heterogeneous nature. Nodes and links at the underlying infrastructure have different capacities and available resources might change at any time, which presents challenges to the SFC placement. Even after an SFC is properly placed and is initially fulfilling the service requirements, new challenges arise at service execution time.

To increase the profit of service providers in 5G networks, it may be important to maintain the expected QoS, avoiding or minimizing losses caused by SLAs violations, even in the presence of disturbances that might occur at the system. However, QoS maintainability is a challenging task under dynamic environments.

Since, in 5G environments, services are delivered/consumed to/by mobile equipment, ongoing services are highly prone to variations as the user that is being served moves between different locations, using different access nodes to access the services. Therefore, it is difficult to guarantee seamless service continuity and meet the service latency requirements, as the current access node of the user may become too distant or new links may have greater delay, especially for latency-stringent classes of service, such as the 5Gs URLLC (Ultra-Reliable Low Latency Communication).

Some works in the literature propose the VNF migration between different locations to enhance the network resilience to counter the degradation in the quality of service (QoS). The VNF migration may be triggered by different situations: (i) to cope with user mobility—migrating VNFs when users move towards access nodes whose location is too far from the service or the reconfigured path has a higher latency, resulting in the inability of maintaining the service delay requirements as defined in the SLA; (ii) for load balance purposes—VNF migration may be a useful strategy to perform load balancing by migrating VNFs from overloaded nodes to underloaded ones belonging to the same service provider; (iii) to reduce energy consumption—VNF migration may also be employed to migrate VNFs from underloaded nodes, allowing them to be turned off to save energy. An embodiment of the invention considers that migrations occur to deal with the impact caused by the user mobility.

The VNF migration problem imposes several challenges that must be tackled. First, there must be a decision-making process as to whether to migrate. The migration decision must correctly identify the need for migration and select an appropriate recipient node. A migration path must also be selected to transfer the required data, such as VNF image and VNF state for example, from the original VNF location to the recipient node. The resources and time required to migrate a VNF must also be considered, and a balance must be taken carefully between [1] the performance gains, and [2] the operation cost, generated by the migration.

All of these aspects pertain to a single VNF migration. If the case of the migration of an SFC, which may comprise several VNFs, additional challenges and complexity arise. Because one VNF migration impacts the decision-making of another VNF migration in the chain, the SFC migration cannot be solved as a set of individual VNF migration decisions. Rather, the SFC migration problem may have to be solved not only considering the constraints of each VNF, but also the requirements of the whole chain of VNFs in the SFC. Moreover, migrating the whole SFC may be more costly, since all VNFs of the chain must be migrated. Therefore, a decision algorithm for the SFC migration may consider the total migration cost and reduce it whenever is possible.

An embodiment of the invention therefore addresses the SFC migration problem by providing a proactive and iterative migration strategy that focuses on solving performance issues caused by users mobility by migrating the fewest number of VNFs possible. In more detail, an embodiment of the invention anticipates the movement of users and estimates the impact of their mobility on the compliance with service SLAs regarding the delay, triggering a service migration procedure when needed. When triggered, the migration algorithm decides which VNFs of the SFC should be migrated and where to migrate those VNFs, addressing the challenges imposed by the service, resource utilization and migration constraints, maintaining the cost of migration as low as possible. An embodiment of the invention also considers a dynamic edge environment in which concurrent SFC placement and migrations might be occurring at the time that an SFC is being migrated to a new location, which also introduces new challenges related to the availability of resources required for migration.

C. DETAILED DISCUSSION OF ASPECTS OF AN EXAMPLE EMBODIMENT OF THE INVENTION

To address the challenges discussed above, an example embodiment of the invention may comprise the following elements: [1] an approach to predict user mobility based on multiple Markov chains; and [2] an iterative algorithm for SFC migration that detects performance issues, decides which VNFs of the chain must be migrated and finds suitable nodes to receive the migrating VNFs, considering the complex restrictions of the problem.

In the following subsections aspects of an example embodiment will be discussed. Initially, in the first section, a model of the system is disclosed. The second section discloses a strategy for estimating the mobility migration. The third section discloses an example SFC migration strategy and the related constraints.

C.1 System Model, and Notation

This section describes a system model according to one embodiment, and its related notations. The SFC migration problem involves finding the location to migrate an SFC that is executing at the underlying infrastructure, considering the problem constraints. The model according to one embodiment contains elements of the underlying infrastructure and the entities that are required to implement the services as well as notations to describe processes and requirements related to the SFC migration solution. An overview of the notations and their descriptions can be found in Table 1, below.

The underlying infrastructure is described as an undirected graph G=(H,A,L) whose vertices represent the edge nodes, and the edges represent the network links that interconnect these nodes. The set $H=\{h_1, h_2, \ldots, h_n\}$ represents the computing nodes (or host nodes) where VNF Instances may be executed. Each computing node have a certain capacity in terms of CPU and memory resources. The available resources at a node vary according to the resources that are in use by hosted VNFs and are limited by the node total CPU and memory resource capacity. The available CPU and memory resources—that is, the amount of CPU and memory resources that is not in use at a node at a given time—are represented respectively as $ca_h$ and $ma_h$. The set $A=\{a_1, a_2, \ldots, a_n\}$ represents access nodes that connect users to the network and whose resources cannot be used to place VNFs. However, both access and computing nodes may be used to forward packets in the network. The set $L=\{l_{h_1,h_2}^1, \ldots, l_{h_n,h_m}^k\}$ represents the physical links that connect access or computing nodes and that transmit service packets between nodes. A link $l_{h_n,h_m}^k$ is the $k^{th}$ link—since more than one link may connect two nodes—that connects the host nodes $h_n$ and $h_m$. Links may also connect an access node $a_n$ to a host node $h_m$ (e.g., $l_{a_n,h_m}^k$). The available bandwidth of a link is represented as $bw_l$, with $l \in L$.

TABLE 1

| Notation | Description |
| --- | --- |
| G = (H, A, L) | Undirected graph of the physical network. |
| $H = \{h_1, h_2, \ldots, h_n\}$ | Set of nodes where the VNFs may be executed. |
| $L = \{l_{h_1,h_2}^1, \ldots, l_{h_n,h_m}^k\}$ | Set of links in the network. |
| $bw_l$ | Bandwidth available at link $l \in L$ |
| $path(h_n, h_m)$ | Represent a set of links that form a path between nodes $h_n$ and $h_m$ |
| $d_{n,m,k}^s$ | Delay of link k between nodes $h_n$ and $h_m$, considering the load and bandwidth demand of SFC s |
| $A = \{a_1, a_2, \ldots, a_n\}$ | Set of access nodes that connects users to the network |
| $U = \{u_1, u_2, \ldots, u_n\}$ | All the users that requests SFCs |
| $X_u$ | Set that contains the current and next predicted location of user u |
| $ca_h$ | Available CPU resource at node h |
| $ma_h$ | Available memory resource at node h |
| $IM_h = \{vi_1, vi_2, \ldots, vi_n\}$ | List of VNF images available at node h. |
| $v_s^i$ | $i^{th}$ VNF Instance of SFC Instance s |
| $D_c(v_{i,s}^{type})$ | CPU demand for the type of VNF Instance $v_s^i$ |
| $D_m(v_{i,s}^{type})$ | Memory demand for the type of VNF Instance $v_s^i$ |
| $size(v_{i,s}^{type})$ | Total size for the type of VNF Instance $v_s^i$ |
| $SFC_i^{req}$ | i-th SFC Request |
| $SFC_y^{inst}$ | y-th SFC Instance that represents an executing service |
| $D_{bw}^s$ | Required bandwidth for SFC Instance s |
| $Remaining_{Time}(SFC_y^{inst})$ | Remaining service time for a SFC Instance |
| $d_{mig}^{v_s^i, h_n}$ | Migration delay of VNF Instance $v_s^i$ from its host node to node $h_n$ |
| $d_s^{a_n}$ | Estimated service delay of SFC Instance s, considering access node $a_n$ |
| $d_s^{max}$ | Maximum delay agreed in the SLA of SFC s. |
| $p_s$ | Migration plan for SFC Instance s |
| $g_{i,k}^s$ | Estimated delay gain when migrating VNFs in the interval [i, k + 1) of SFC Instance s |
| $o_i^s \in H$ | The i-th node considering the ordered nodes that are part of an SFC Instance s (VNF host node or destination node) |
| M | Set of VNFs of an SFC being considered for migration |
| $path_{shortest}$ | Shortest path in terms of delay for between two nodes |
| $path_{current}(o_i^s, o_j^s)$ | Current path being used to connect the nodes $o_i^s$ and $o_j^s$ |
| $limit_{bw}$ | Percentage of the available bandwidth to be initially considered during migration decision |
| $max_{bw}^l$ | Maximum percentage of available bandwidth of link l to be used by one VNF migration |
| $node(v_s^i)$ | Denotes the computing node that hosts the $i^{th}$ VNF Instance of the SFC s |

In the system, users are represented by the set $U=\{u_1, u_2, \ldots, u_n\}$. An embodiment may consider that these users might move from one place to another at any time. As mentioned above, each user accesses the network through an access node. Therefore, the current user location is abstracted as the access node that a user is currently using to access the network. An embodiment may consider that a mobility predictor may predict the future user location—that is, the next access node that a user will rely on to access the network at its next movement. The notation $X_u$ denotes the set containing the current and predicted locations of a user u at a given time—that is, an element of the set may be the access node that the user is currently using to access the network, or an access node that the user is likely to use in its next mobility event.

An SFC describes an ordered chain of VNFs that together provide a specific service. Each VNF is responsible for performing a specific function when a service packet arrives and it has a given type (e.g., image processing, firewall). A VNF image of a given type must be present at the node to instantiate a VNF, and each VNF of a given type demands a certain amount of CPU and memory resources, denoted as $D_c(v_{i,s}^{type})$ and $D_m(v_{i,s}^{type})$, that must be available at the hosting node. The computing node that is hosting a VNF instance $v_s^i$ is denoted as $node(v_s^i)$. The VNF processing results in a new packet that will be forwarded to the next VNF in the chain. A user may request a service by making SFC Requests, denoted by $SFC_i^{req}$, where the index i represents the $i^{th}$ SFC request that arrived at the system. An SFC request describes the set of VNFs of a specific type that must be instantiated to provide the service and the service SLA. Upon the arrival of an SFC Request, an SFC placement algorithm is executed to find appropriate nodes to host the required chain of VNFs, respecting resource and service constraints—such as the maximum service delay $d_s^{max}$ described at the SLA). Each computing node has a set of VNF images $IM_h=\{vi_1, vi_2, \ldots, vi_n\}$ available.

The placement of an SFC generates an SFC Instance and a set of new VNFs Instances that are instantiated at the respective computing nodes. The $i^{th}$ VNF Instance of an SFC instance $SFC_k^{inst}$ is represented as $v_s^i$. Alternatively, a new SFC instance may be mapped to VNF instances that are already running, sharing them with other services that require the same VNF type. An SFC instance keeps track of the user that requested the SFC, the set of VNF Instances that implements the service, the remaining service time—denoted as $Remaining_{Time}(SFC_y^{inst})$—, the user's current access node and a destination node, to where the packets must be delivered after being processed by the chain. The SFC Instance also keeps track of the service path currently in use. The service path—composed of physical links—connects the user's access point to the destination path, traversing all nodes that host the VNFs of the SFC and is the path that will be used to transmit the packets of a service.

When an SFC is instantiated, the links that form the service path have a portion of their bandwidth reserved, based on the demand of the service, denoted as $D_{bw}^s$. The estimated delay to transmit the packet of an SFC instances through a link is denoted as $d_{n,m,k}^s$, and considers the reserved bandwidth for a service and the service's average load, based on its average packet size. The estimated total delay for a service, which comprises the VNFs packet processing delays and the transmission delay from the access node $a_n$ (which may be current or the next predicted access node of the user) until its destination is represented as $d_s^{a_n}$. FIG. 1 discloses an underlying infrastructure 100 in which an SFC instance 102 is executing.

With reference to the example of FIG. 1, during the lifespan of a service executing in the infrastructure 100, SFC instance 102 migrations might be necessary to cope with performance issues caused by user mobility. A migration can be triggered at any time to solve these issues, finding a new location for the service. The notation $o\_i$'s represents the set of VNFs 104 and the destination node of an SFC instance, where i represents the order of the node in the SFC instance 102—respecting the chain order and with the destination node as the last element. The migration algorithm estimates a delay gain $g\_(i,k)$'s that can be achieved by migrating a subset M of VNFs in the interval [i,i+k]. The result of the migration decision process for an SFC instances 102 is a migration plan p_s, which contains VNFs 104 that will be migrated and a destination node, a migration path, and an updated partial service path—that connects the VNF 104 at its new location to the following VNF 104—for each migrating VNF 104. The migration path is the set of links that may be used to transfer data of a certain migrating VNF from its original host node to its new host node. After the migration, the VNF, which may or may not be the VNF(s) 104, will be located at a new host, thus, the service path 106 is updated to reflect this change. Note that while all the VNFs are designated as 104 in FIG. 1, it should be understood that, in an embodiment, the set of VNFs that need to be migrated may be different from the set of VNFs that belongs to an SFC, such as the SFC 102.

C.2 Mobility Prediction

According to some of the literature, ensuring the availability of the network services anytime can only be feasible if it were feasible to predict, at any time, where a user will likely demand network usage. In 5G networks, a provider service area is divided into small geographic areas called "cells." Each cell provides wireless coverage to user devices managed by a single access node or base station.

Mobile users may require handoff from one cell or base station to another while using a service. For the service provider to offer a successful handoff to its mobile users, it is necessary to ensure that the new resources demanded by the service are granted to the session in progress by the access point where the user is being transferred to. Otherwise, the session will be terminated or prematurely discarded due to insufficient resources in the new cell.

As also noted in the literature, one way of minimizing the dropping of handoff requests is to reserve enough resources at all neighboring cells for the handoff request. However, such an approach leads to a waste of resources and the possibility of significantly increasing the blocking rate for new connection requests. A more streamlined approach is to predict user mobility to identify the most likely user base stations to migrate and perform the necessary actions. In this context, an embodiment of the invention implements a mobility prediction mechanism to identify the moments when an SFC migration might be necessary.

The migration strategy follows a proactive approach which focuses on anticipating performance issues that can affect executing service. Therefore, the migration relies on the mobility prediction mechanism to predict the next movement of the user and estimate if this movement will incur in higher service delays, anticipating the impact caused by the mobility of a user.

Thus, one example embodiment of the invention uses Markov chains for modeling and predicting user mobility. A Markov chain is a probabilistic model that describes a sequence of events that might occur according to a given probability. State changes are called transitions, which have an associated probability. Markov chains in which the future state depends only on the current state are called first order chains, whereas chains in which the future state depends on n past states are called chains of n-order. In an embodiment, the Markov chain represents user mobility in the network. Since each cell is accessible through an access node, an embodiment may abstract the fine-grained location of the user and represent it as the access node that is responsible to connect the user to the network. Therefore, each state of the chain represents an access node that a user might use to access the services, whereas transitions represent the mobility event in which the user moves from one node to another.

Figure 2:
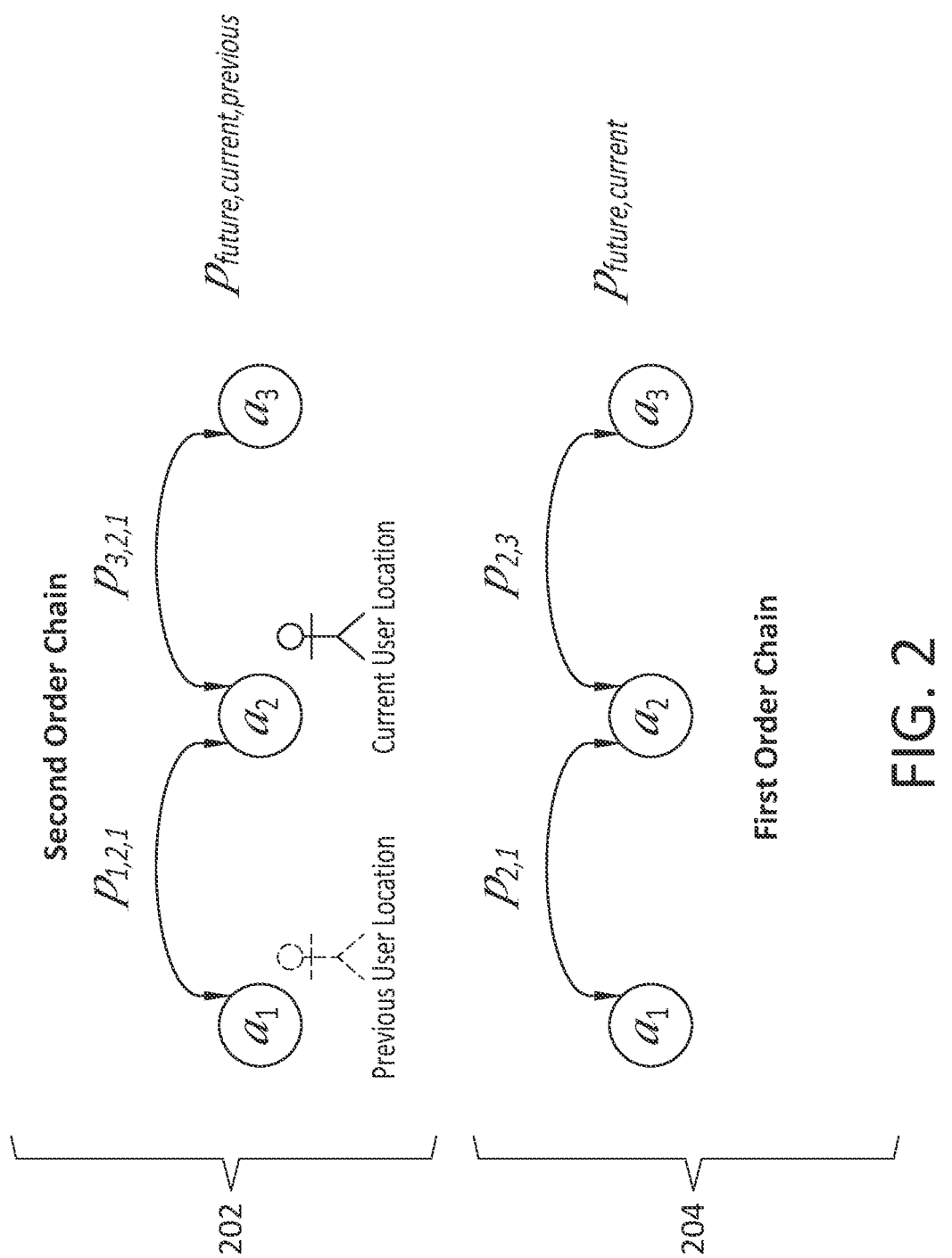
FIG. 2 discloses aspects of user mobility represented in Markov chains according to one example embodiment.

FIG. 2 discloses user mobility as represented in Markov chains. In particular, FIG. 2 shows a representation of a second order chain 202 and a first order chain 204. The main difference is that the main, or first order, chain only 204 considers the current state of the system, that is, the current access node, whereas the second order chain 202 considers both the current and previous states. The transition probabilities for the second 202 and first 204 order chains are calculated according to the following Equations 1 (upper equation) and 2 (lower equation), respectively:

$$P_{f,c,p} = \frac{\text{number of movements from node } p \text{ to node } c, \text{ then to node } f}{\text{number of movements from node } p \text{ to node } c, \text{ then to any adjacent node}}$$

$$P_{f,c} = \frac{\text{number of movements from node } c \text{ to node } f}{\text{number of movements from node } c \text{ to any other adjacent node}}$$

Instead of relying on only one chain for the prediction, one embodiment of the invention comprises an approach in which multiple chains are used. In this approach, three types of chains are built, as described below. These chains are explored from the most specific (chain 1) to the most generic (chain 3), depending on the availability of the mobility data of the user whose next movement prediction is required. The number of access nodes returned by the mobility predictor, that is, the N locations that the user is most likely to move in his/her next mobility, is a configurable parameter, referred to here as N.

In an embodiment, three different Markov chains may be employed. The first of these is a second order Markov chain for a given user—this chain may be built using the historical mobility data of a specific user. Return access nodes that are most probable of being visited by the specific user in a next movement, considering the current and previous locations o the user. The next Markov chain is a generic second order Markov chain—this chain may be using the historical mobility data of all users seen in the system. Return access nodes that are most probable of being visited by a user in a next movement, considering the current and previous locations of the user. The third chain, in this embodiment, is a generic first order Markov chain—this chain may be built using the historical mobility data of all users seen in the system. Return access nodes that are most likely to be visited by a user in a next movement, considering only the current location of the user.

Figure 3:
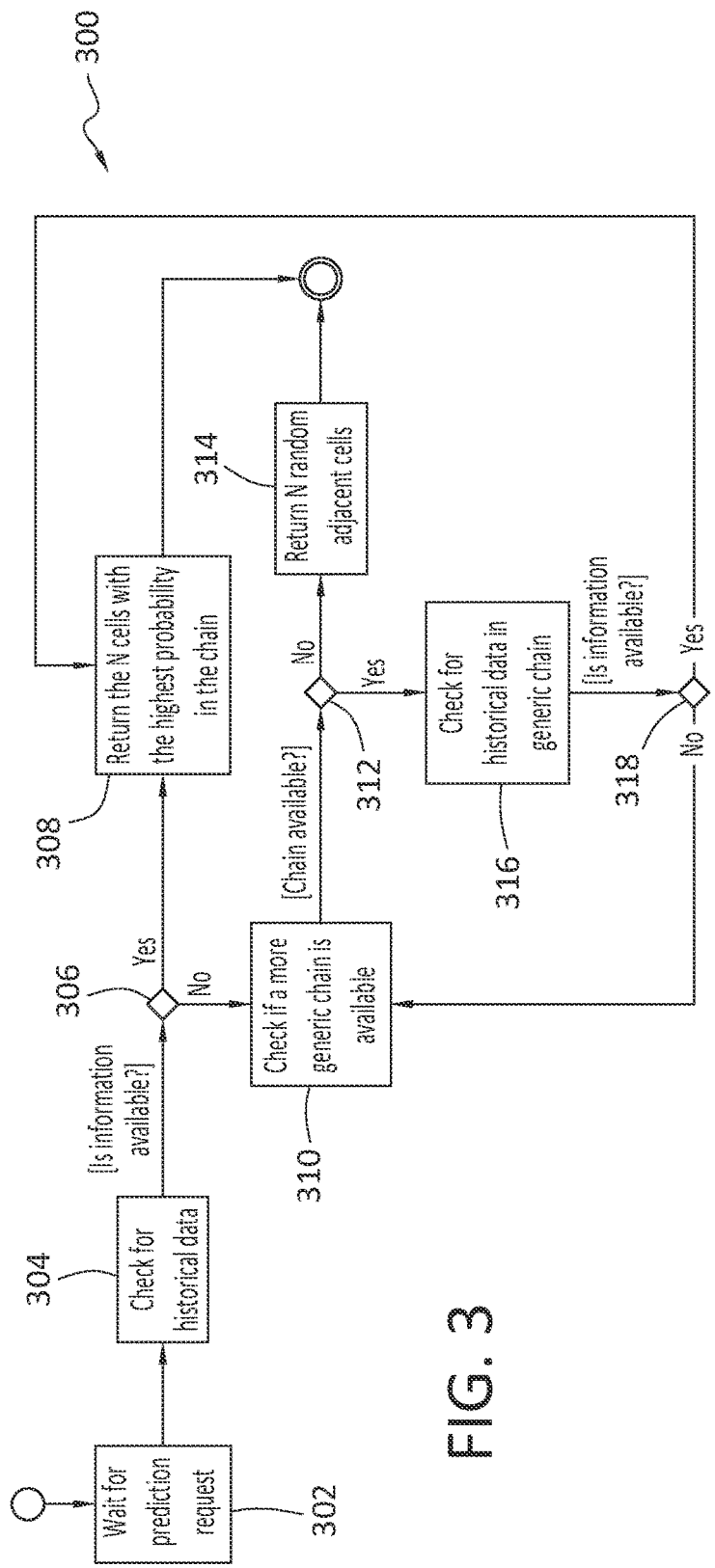
FIG. 3 discloses an example mobility prediction procedure according to one example embodiment.

With attention now to FIG. 3, there is disclosed an example embodiment of a mobility prediction method/algorithm, referenced at 300. In an embodiment, the algorithm 300 may begin with a ready status in which the prediction algorithm 300 waits 302 for a request that a prediction be made as to a next user movement. In an embodiment, the prediction algorithm 300 starts with the most specific Markov chain, the second order chain, in which probabilities are calculated based on the mobility of the specific user, so that previous mobility data from other users do not impact the prediction of the current user. When a prediction request for the next location of a given user arrives, the algorithm 300 checks 304 if the chain contains any previous data regarding the mobility of this specific user. If it is determined 306 that data is available, the algorithm returns 308, as the result of the prediction, N locations to which the user is most likely to move.

If it is determined 306 that data of the current user is not available, then the algorithm 300 performs a check 310 to determine 312 if a more generic chain is available. If not, the algorithm 300 may choose 314, as the prediction result, N random nodes that are adjacent to the current user node. If a more generic chain is determined 312 to be available, the algorithm 300 may check 316 for historical data in the generic second order chain 310, which would enable historical data from other users to be used to calculate the transition probabilities.

Considering data from all users, if the data is determined 318 to still be unavailable, the algorithm 300 falls back to the generic first order chain that only considers the current state when calculating the probabilities of the next node. In the case that the data is determined 316 to be available (e.g., the user is in a node that no other user has used), then the algorithm 300 chooses as the prediction result N nodes with the highest probability in the chain.

C.3 SFC Migration

This section discloses an example approach to manage SFC migrations, according to one embodiment of the invention. The strategies for the migration triggering, migration decision algorithm—where suitable nodes to receive the migrating VNFs and migration paths are chosen—and the migration execution are detailed.

C.3.1 Migration Triggering

An important aspect regarding the migration of SFCs is deciding when the migration should occur. Migrations may be triggered using a reactive approach in which the SFC is migrated to solve performance issues that are currently affecting a service SLA or proactively migrating SFCs before the SLA is degraded. Also, different metrics may be considered to detect potential performance issues. A load-based approach may migrate overloaded VNFs whenever the usage of the hosting node resources gets close to its maximum capacity. In contrast, a delay-based migration approach requires the monitoring of packet processing and forwarding times delay verifying whether the packets are taking too much time to reach the service destination.

A migration triggering mechanism according to one example embodiment follows a proactive approach based on the mobility predictor discussed above. Since it may be a goal of one embodiment to reduce performance issues caused by user mobility, a load-based approach may not be effective when the distance of the user from the SFC is the root cause of the performance issues. Therefore, an embodiment of the invention may adopt a delay-based approach, focusing on keeping the service delay within the maximum delay specified in its SLA.

Due to the proactive approach of the triggering mechanism, it may be necessary to know beforehand if a migration will result in better performance. Therefore, a monitoring component that keeps track of the service, nodes and link characteristics (such as packet processing time in each VNF, link transmission delay and average packet generation rate of the service) is required to allow making estimates of a future service delay, considering the next movement of the user.

Figure 4:
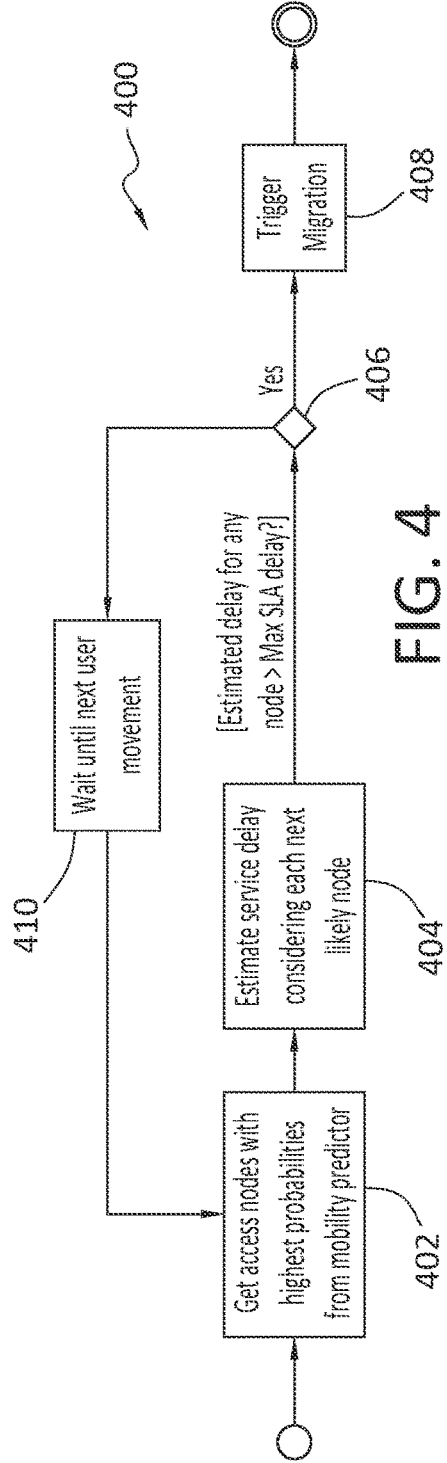
FIG. 4 discloses an example migration triggering mechanism according to one example embodiment.

With attention now to FIG. 4, an example migration triggering mechanism/method according to one embodiment is referenced at 400. In particular, the example of FIG. 4 discloses various activities involved in the SFC migration triggering procedure, which integrates the SFC migration process. Initially, the N access nodes that the user is most likely to use as an access point in its next movement are retrieved 402 from the mobility predictor. Then, an estimate of the service delay is calculated 404 considering each node returned by the predictor. If the estimated service delay for any of these nodes is determined 406 to be above the maximum allowed delay defined in the SLA, the migration is triggered 408. In case the delay is below the maximum for each node, then the mechanism waits 410 for the next user movement.

C.3.2 Iterative Migration Decision

After the migration algorithm detects that an SFC must be migrated, the next process is to decide which VNFs that compose the SFC should be migrated to solve the identified performance issue. To reduce the amount of utilized resources and the time required by the SFC migration procedure, an example embodiment of the invention implements an iterative approach that identifies the smallest number of VNFs of the chain that must be migrated to improve service performance and avoid SLA violations.

Figure 5:
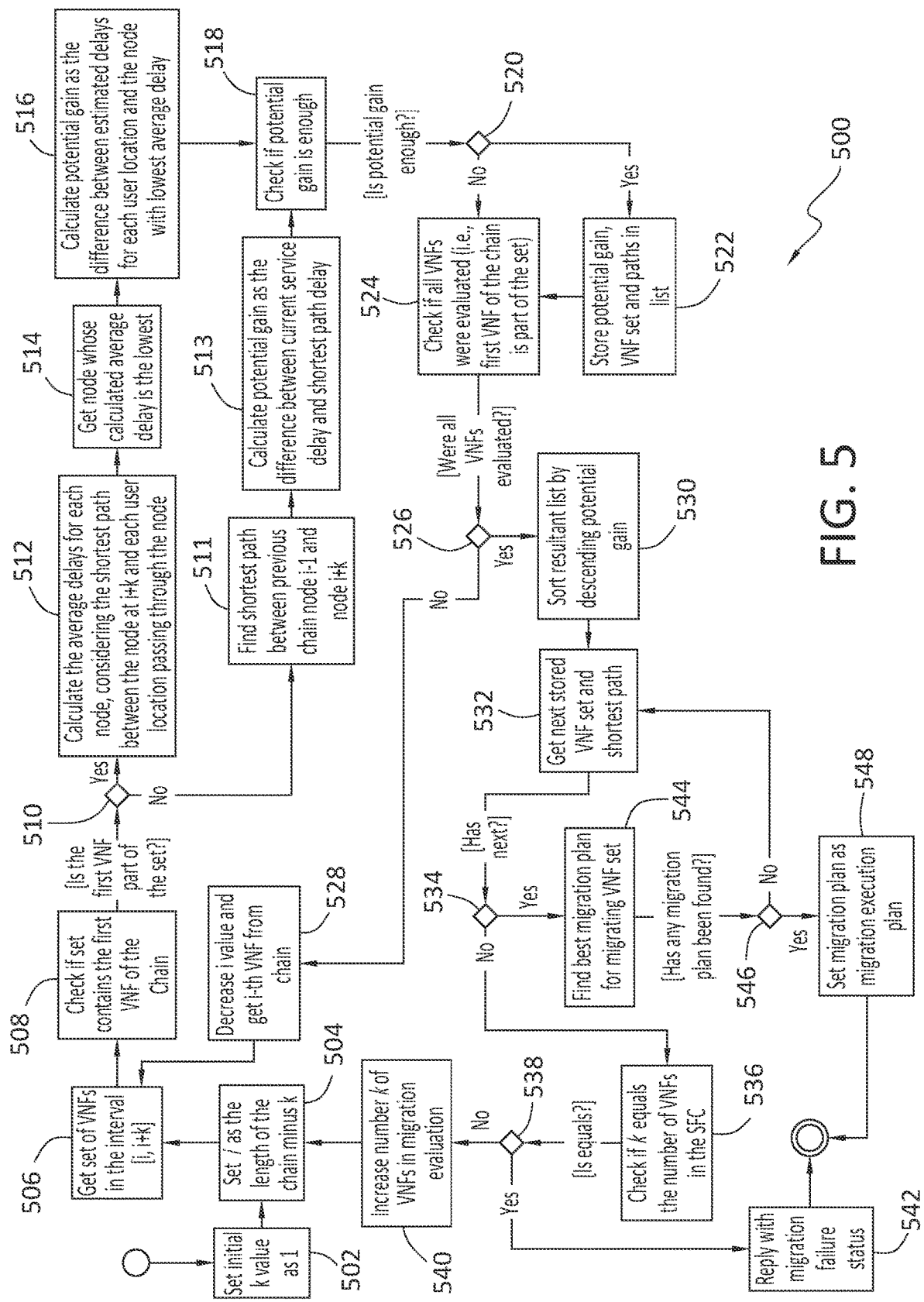
FIG. 5 discloses an example procedure to select the VNFs to be migrated according to one example embodiment.

With attention now to FIG. 5, an example method for selecting VNFs to be migrated is referenced at 500. In each iteration, the method 500 estimates the performance gains of migrating k VNFs of the SFC. The gain metric considered is the reduction of the service delay.

As shown in FIG. 5, the method 500 starts 502 with a k value of one, which means that at the initial iteration, only one VNF of the chain is being considered to be migrated. Then, it is necessary to identify which VNF of the chain can be migrated so that the performance issue can be solved with a single VNF migration. Then, I is set 504 as the length of the chain minus k, a set of VNFs in the interval [i, i+k] is obtained 506, and a check 508 performed to determine 510 if the set contains the first VNF of the chain.

If the set does not contain the first VNF of the chain, then the method 500 finds 511 the shortest path between the previous chain node i−1 and the node i+k. Next, the potential gain is calculated 513 as the difference between the current service delay and the shortest path delay, and a check 518 then performed to determine if the potential gain is enough to justify a migration of the VNF. On the other hand, if it is determined 510 that the set does contain the first VNF, then the method 500 calculates 512 the average delays for each node, considering the shortest path between the node at i+k and each user location passing through the node. Then, the node whose calculated average delay is the lowest is obtained 514. Then, the method 500 may calculate 516 the potential gain as the difference between the estimated delays for each user location and the node with the lowest average delay. A check 518 may then be performed to determine if the potential gain is enough to justify a migration of the VNF.

As the foregoing discussion illustrates, the method 500 may iterate over the chain of VNFs, estimating the gains that can be achieved if the i-th VNF of the chain is migrated. To calculate the gain of migrating the i-th VNF, the method 500 finds 511 the shortest available path—in terms of delay—between the ordered node o of index i−1 and the ordered node i+k of the chain. If a path shorter than the current path between these nodes exists, then the gain is calculated 513 as the difference of the service delay of the current path and the estimated delay of the shortest path.

Equation 3 (below) shows the gain calculated for an SFC instance s, migrating the VNFs between i−1 and i+k. Note that a different calculation is made if the first VNF of the chain is being considered for migration. In this case, the method 500 analyzes the delay gain considering the set $X_u$, which contains the current user location and the predicted next locations. The number of predicted nodes/locations that the user is most likely to move in his/her next mobility event depends on the N parameter used in the mobility predictor. The average current delay $\alpha_{i,k,u}$ and the average shortest delay $\beta_{c,i,k,u}$ passing through an intermediate node c are respectively calculated as described in Equations 4 and 5. An intermediate node c is considered as an intersection node between each location $a_z \in X_u$ and the node o with index i+k.

If the calculated gain is determined 520 to be enough to solve the identified performance issue, that is, the current service delay minus the calculated gain is below the maximum delay in the service SLA for each user location, as shown in Equation 6, the gain value, shortest path, and index i are stored 522 for further evaluation. After that, the method 500 checks 524 whether all VNFs were evaluated 526, that is, if a VNF was considered for migration at some point).

If it is determined 526 that all VNFs were not evaluated, the method decreases 528 the index i, and continues the analysis, as shown on the left part of FIG. 6 (discussed below). On the other hand, if it is determined 526 that all VNFs were evaluated, then the method 500 sorts 530 the stored sets of migrating VNFs by a decreasing gain value and tries to find the best migration plan, choosing appropriate destinations for the set of migrating VNFs in the nodes that are part of the shortest path. This procedure is explained in further detail below.

With continued reference to FIG. 5, after the stored sets of migrating VNFs have been sorted 530, the method 500 may then obtain 532 the next stored VNF set and shortest path information. In particular, the method 500 may determine 534 if there is a next VNF set and, if so, the best migration plan, if any, for migrating that VNF set may be found 544. In particular, if it is determined 546 that a migration plan has been found, the method 500 may set 548 that migration plan as the migration execution plan. On the other hand, it if is determined 546 that no migration plan has been found, the method 500 may return to 532.

If, at 534, the method 500 determines that there is not a next stored VNF set and shortest path, then a check 536 may be performed to determine 538 if k equals the number of VNFs in the SFC. If so, a reply 542 may be generated indicating a migration failure status. If k is determined 538 to not equal the number of VNFs in the SFC, then the number k of VNFs in the migration evaluation may be increased 540, and the method 500 may then return to 504.

$$g^s_{i,k} = \begin{cases} \sum_{l^k_{n,m} \in path_{current}(o^s_{i-1}, o^s_{i+k})} d^s_{n,m,k} - \sum_{l^k_{n,m} \in path_{shortest}(o^s_{i-1}, o^s_{i+k})} d^s_{n,m,k}, & i > 1 \\ \max_{c \in H}(\alpha_{i,k,u} - \beta_{c,i,k,u}), & i = 1 \end{cases} \quad (3)$$

$$\alpha_{i,k,u} = \frac{\sum_{a_z \in X_u} \left( \sum_{l^k_{n,m} \in path_{shortest}(a_z, o^s_i)} d^s_{n,m,k} + \sum_{l^k_{n,m} \in path_{shortest}(o^s_i, o^s_{i+k})} d^s_{n,m,k} \right)}{|X_u|} \quad (4)$$

-continued $$\beta_{c,i,k,u} = \frac{\sum_{a_z \in X_u} \left( \sum_{l_{n,m}^k \in path_{shortest}(a_z,c)} d_{n,m,k}^s + \sum_{l_{n,m}^k \in path_{shortest}(c,o_{i+k}^s)} d_{n,m,k}^s \right)}{|X_u|} \quad (5)$$

$$d_s^{max} \geq d_s^{a_n} - g_{i,k}^s, \; \forall \; a_z \in X_u \quad (6)$$

In an embodiment, the best migration plan will be used to perform the migration. If a migration plan cannot be found 546, then the method 500 continues the analysis with an increased k value—that is, the analysis continues considering the migration of an increasing number of VNFs. FIG. 6 shows an example of each VNF being evaluated, with different k values. In particular, FIG. 6 discloses an example of an iterative migration evaluation 600 with an SFC composed of 3 VNFs.

Figure 6:
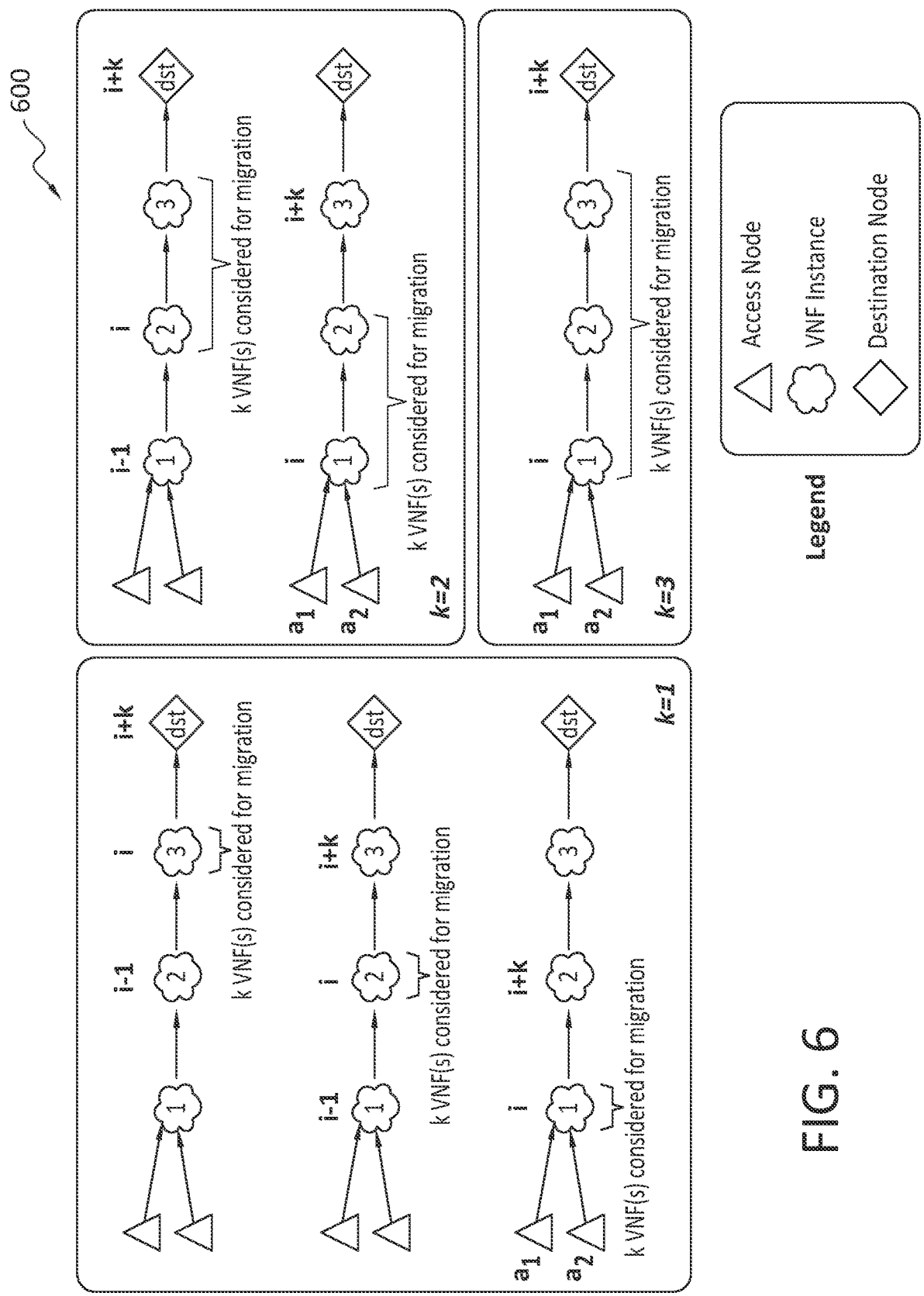
FIG. 6 discloses an example of the iterative migration evaluation with a SFC composed of 3 VNFs according to one example embodiment.

In the example of FIG. 6, where k=1, each different VNF of the SFC is considered as a possible candidate for migration. In the next iteration, where k=2, the VNFs 2 and 3, and 1 and 2, are considered as possible candidates for migration. In the final iteration of the migration evaluation process, where k=3, all of the VNFs 1, 2, and 3, are considered as possible candidates for migration.

C.3.2.1 Target Nodes and Migration Paths Definition

After finding which VNFs should be migrated using a shorter service chain path that can lead to better latency performance, the next part of the VNF migration process is to find nodes in this shorter path that are suitable for receiving the VNFs, with a reasonable migration cost. In this process, different allocation possibilities are generated, mapping the set of migrating VNFs to the nodes available at the shortest path. These possibilities must comply with the resource and service delay constraints discussed below.

Figure 7:
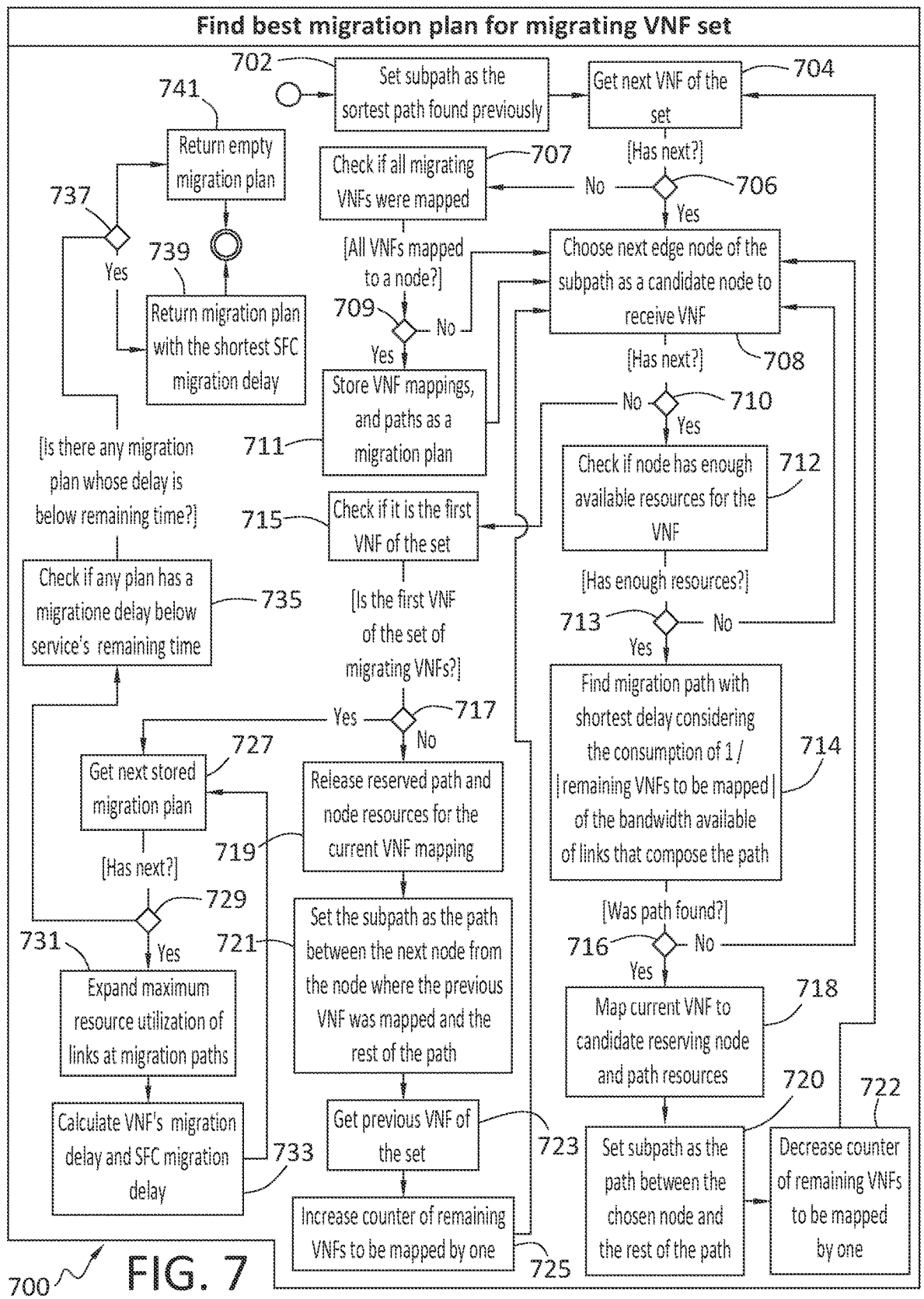
FIG. 7 discloses an example configuration of target nodes and migration paths definition according to one example embodiment.

As shown in FIG. 7, which discloses an example method 700 for target nodes and migration paths definition, this part of the method according to one embodiment of the invention begins setting as the subpath 702—whose nodes can be used for allocation—the shortest path stored as part of the method 500. Then, this part of the method gets 704 the next VNF of the set of candidate VNFs for migration—sorted according to their order in the SFC—and tries to allocate this VNF in the first node of the subpath whose resources constraints are satisfied—that is, the node that will receive the VNF must have enough available resources to satisfy the VNF demands. If the node has the necessary resources, then the algorithm considers these resources as reserved and finds 714 a migration path between the current VNF location and the node being evaluated. At this phase, the algorithm considers that this migration path will consume $limit_{bw}$, defined in Equation 7 below, of the available bandwidth of the links that compose the migration path.

$$limit_{bw} = \frac{1}{remainingVNFsToBeMapped} \quad (7)$$

The $limit_{bw}$ threshold is necessary to avoid making the solution unfeasible by taking all the bandwidth of a link that would be necessary for the migration of other VNFs of the set whose node and path is still unknown. For instance, if the algorithm considers the consumption of all available bandwidth of links that compose the chosen migration path of a VNF, when deciding where to migrate the next VNF of the SFC, the only feasible migration path might be the one that shares a specific link with the previous migration path, whose resources have been already taken for the migration of the previous VNF, rendering the migration plan unfeasible. Therefore, the algorithm avoids this situation by considering the consumption of only $limit_{bw}$ of the available bandwidth, so that if the next VNFs migration paths require the same link, enough link resources will be available to migrate each one of them.

Then, the destination node along with the migration path for the current VNF are stored as a possible migration plan. After that, the subpath is updated to contain only the links and nodes starting from the last mapped destination node forward. Because VNFs must follow the order established in the SFC, allowing the next VNF to be allocated in a node that is farther in the chain than the node in which the previous VNF was mapped would incur an additional delay overhead.

Next, the algorithm tries to find the recipient node, in the updated subpath, and the migration path for the next VNF candidate for migration of the set, repeating the same aforementioned process. When the last node of the subpath is evaluated as a possible candidate to receive a VNF, the algorithm continues to explore the possibilities of allocation of the previous VNF. The focus of this part, that is, method 700, of the algorithm is to find the different migration possibilities for the VNFs in the set, storing the destination nodes and migration path for each VNF as a possible migration plan for each possibility that satisfies the constraints.

As previously mentioned, the $limit_{bw}$ is applied for all links that compose a migration path. However, some links might be shared between multiple migration paths, while others might be used to migrate only one VNF—that is, used by only one migration path. Thus, after the phase of selecting possible combinations of recipient nodes and migration paths for the migrating VNFs, the algorithm optimizes the amount of resources of a link to be used to migrate a VNF. For each stored migration plan, the amount of bandwidth resources of the links in the migration paths that the migration is allowed to use is expanded to the link's maximum, so that the migration can occur as fast as possible. If a link is used for the migration of more than one VNF of the SFC, then each VNF migration will be allowed to use the link's available bandwidth equally, as defined by Equation 8.

$$max_{bw}^l = \frac{1}{\text{\# of migration paths that use link } l} \quad (8)$$

After that, the best plan will be selected according to a migration delay criterion. The best migration plan will be the one with the shortest migration delay. The SFC migration delay is considered as the greater migration time of all migrating VNFs of the SFC, as shown in Equation 9. The migration possibility with the fastest SFC migration delay will be used as the migration plan during the execution.

$$SFC_{mig_{delay}} = \max_{v_k^j \in M} \left( d_{mig}^{v_s^j, h_n} \right) \quad (9)$$

With the foregoing discussion in view, further details are now provided concerning the example method 700 disclosed in FIG. 7. At 704, and as noted earlier, the method 700 gets the next VNF of the set of candidate VNFs for migration—sorted according to their order in the SFC. A determination 706 may then be made as to whether there is a next VNF. If so, a next edge node of the subpath may be chosen 708 as a candidate to receive that next VNF. That is, a further determination 710 may be made as to whether or not there is a next edge node available and, if so, a check 712 may be performed to determine if that node has enough available resources to support the VNF if the VNF were migrated to that node. If it is determined 713 that the node does not have adequate resources to support the VNF, the method 700 may return to 708. On the other hand, if it is determined 713 that the node has adequate resources to support the VNF, then the method 700 may advance to 714.

At 714, the method 700 may look to find a migration path with the shortest delay considering the consumption of (1/[remaining # of VNFs to be mapped]) of the bandwidth available of the links that compose the path. If a determination 716 is made that no path is found, the method 700 may return to 708. If the determination 716 is that a path has been found, then the current VNF may be mapped 718 to a candidate node, and node and path resources may be reserved as part of the mapping 718.

After the mapping and resource reservation 718, the subpath may be set 720 as the path between the selected node and the rest of the path. Then, the counter of remaining VNFs to be mapped may be decreased 722 by 1, and the method 700 returned to 704.

Returning now to the determination 706, if there is no next VNF, then a check 707 may be performed as to whether all migrating VNFs have been mapped to a node. If it is determined 709 that all the migrating VNFs have not been mapped, the method 700 may return to 708. If it is determined, on the other hand, that all the migrating VNFs have been mapped, then the VNF mappings and associated paths may be stored 711 as a migration plan.

Returning next to the determination 710, if there is no next edge node, a check 715 may be initiated regarding whether the VNF is the first VNF of the set, that is, whether it is the first VNF of the set of migrating VNFs. If it is determined 717 that the VNF is not the first VNF of the set, then the method 700 may release 719 the reserved path and node resources for the current VNF mapping. Then, the subpath may be set 721 as the path between the next node from the node where the previous VNF was mapped, and the rest of the path. At 723, the previous VNF of the set may be obtained, and then the counter of remaining VNFs to be mapped increased 725 by 1.

If it is instead determined at 717 that the VNF is the first VNF of the set, then the method 700 may look 727 to obtain a next stored migration path. If it is determined 729 that there is a next stored migration path, then the method 700 may expand 731 the maximum resource utilization of links at the migration paths, and the VNFs migration delay and SFC migration delay calculated 733, after which, the method 700 may return to 727.

Finally, if it is determined 729 that there is not a next migration plan, the method 700 may advance to 735 where the method 700 may look to determine if there is any migration plan whose delay is less than the remaining time of the service. If it is determined 737 that there is such a migration plan, the method 700 may return 739 the migration plan with the shortest SFC migration delay. If it is determined 737 that there is no such migration plan, the method 700 may return 741 an empty migration plan.

C.3.2.2 Candidate Node and Migration Cost Constraints

When finding a destination node for a migrating VNF instance $v_{i,j,k}$, a suitable candidate must have sufficient available resources to allocate the demands of the migrating VNF. Equation 10 represents $h_n$ must have enough CPU resources available considering the demand of the VNF. Likewise, Equation 11 shows that available memory resources at the node must be greater than the VNF demand.

$$ca_{h_n} \geq D_c(v_{i,s}^{type}) \qquad (10)$$

$$ma_{h_n} \geq D_m(v_{i,s}^{type}) \qquad (11)$$

Another constraint is related to the time required to migrate a VNF. The migration delay is calculated according to the Equation 13. As shown in Equation 12, a migration must have a delay below the remaining service time—i.e., migrating a VNF cannot take more time than the remaining duration of the service. Otherwise, by the end of the migration, the service would not be necessary anymore. The total size of the VNF is composed of its image and its state, as described in Equation 14. If the VNF image is already available at the destination node, it is not necessary to transfer its image, thus, its size is not considered in delay calculation. Also, if a migrating VNF is stateless, it is not necessary to make a state transfer. Therefore, the state size is zero during the VNF migration delay calculation.

$$d_{mig}^{v_s^i, h_n} < \text{Remaining}_{Time}(SFC_s^{inst}) \qquad (12)$$

$$d_{mig}^{v_s^i, h_n} = \sum_{link \in path(node(v_k^i), h_n)} \frac{size(v_{i,s}^{type})}{bw_{link} * max_{bw}^l} \qquad (13)$$

$$size(v_{i,s}^{type}) = size(v_{i,j,s}^{state}) + size(v_{i,j,s}^{img}) \qquad (14)$$

C.3.3 Migration Execution

After finding the best migration plan for the SFC, containing the VNFs that will be migrated, the destination nodes, the migration paths, and the new service path—considering the VNFs at their new location—the next step is to execute the migration procedure. With attention now to FIG. 8, an example method for VNF migration is disclosed.

Figure 8:
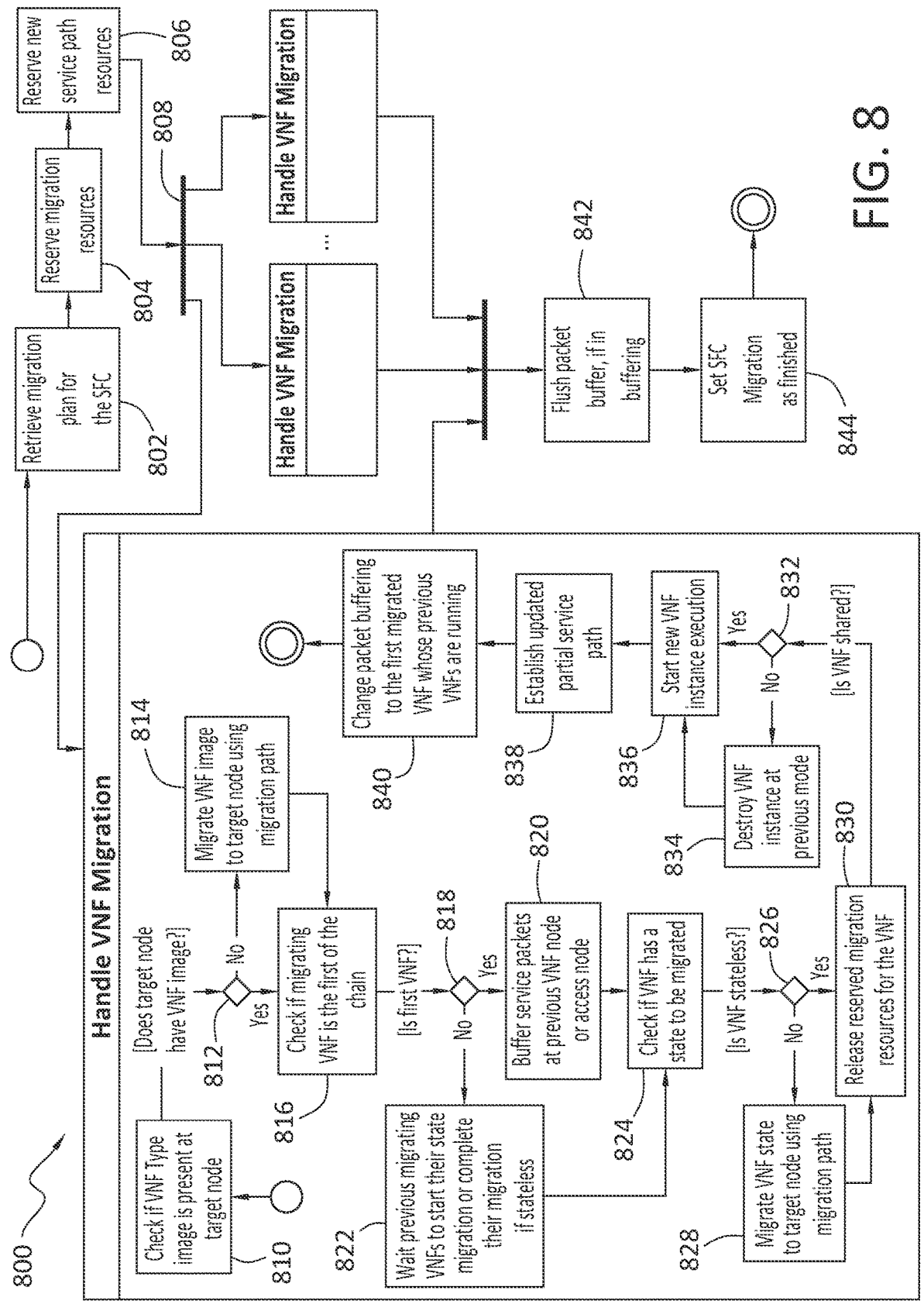
FIG. 8 discloses an example VNF migration execution according to one example embodiment.

As shown in the example method 800 of FIG. 8, after retrieving the migration plan 802, the next step is to reserve the necessary resources 804 for each VNF migration at the underlying infrastructure. This pre-reservation is necessary to avoid the required node and link resources for migration becoming unavailable due to the placement of other SFCs or other concurrent SFC migrations that might occur during the migration. The reserved resources include (i) the bandwidth of links that compose the path that will be used for the VNFs migrations, and (ii) the CPU and memory resources at the nodes that will receive the migrating VNFs.

Then, the bandwidth of links that will form the new service path must also be reserved 806. However, since a link might be used for the migration and to establish the new service path, the step of reserving 806 the service path resources will only reserve resources of links that are not used by any migration path or whose reserved resources for migration is below the required for the service—that is, if the reserved amount of a link for the migration is sufficient for the service demands, only the reservation for the migration will occur. In this way, resource utilization is optimized, avoiding competition for the link resources by the migration and service paths and reducing the migration duration.

Once the required resources are reserved 804/806, a parallel procedure 808 begins for each migrating VNF. In this procedure 808, it is checked 810 whether it is necessary to migrate the VNF image—that is, if the target node is determined 812 not to have the VNF image, it will be necessary to migrate the VNF image 814 to the target, or destination, node. The VNF image transfer occurs only when the destination node does not have the required VNF image. After the image migration, the next step is to migrate the VNF state, in the cases of stateful VNFs. Some constraints must be satisfied to begin the state migration phase.

A check 816 may then be performed regarding whether the VNF is the first of the set of migrating VNFs—considering the VNF order in the SFC—then the packets of the SFC are buffered at the host of the previous non-migrating VNF or access node. This is done to avoid changing the state of the VNF instance at its original location, which would require several state transfers to update the state at the destination node.

If it is determined 818 that the migrating VNF is the first VNF of the chain, then service packets may be buffered 820 at a previous VNF node or access node. Note that before starting the state migration, the VNF instance cannot be processing any packets and the virtual link that connects previous VNFs (or access node) to the migrating VNF instance must be idle, to avoid the arrival of packets—which would change the VNF state at its original location—while the state migration is in place. An additional constraint is that all previous migrating VNFs need to have started the VNF state migration procedure or finished their migration. Note that this constraint is not valid for the first migrating VNF of the set, since there is no other migrating VNF prior to it. With these requirements satisfied, the VNF state—if stateful—is transferred to the destination node. Note that if the migrating VNF is determined 818 to be the first of the chain, then the method 800 may wait 822 for previous migrating VNFs to start their state migration or complete their migration, if stateless.

In more detail, after the buffering 820 and waiting 822 for any previous migrating VNFs, a check 824 may be instantiated to determine 826 if the VNF has a state that must be migrated, that is, to determine 826 if the VNF is stateless or not. If the VNF is not stateless, or is stateful, then the VNF state may be migrated 828 to the target node using the migration path. If it is alternatively determined 826 that the VNF is stateless, then the migration path resources used by the VNF migration are released 830 for the VNF, except the ones that will be used to establish the service path. If the VNF instance is determined 832 not to be shared with multiple SFCs, the VNF Instance at its original location is destroyed 834 and the VNF at the destination node is instantiated. If the VNF instance is determined 832 to be shared, then a new VNF instance execution may be started 836.

Then, the partial service path—which connects the migrated VNF to the previous and next VNFs of the SFC—is established 838. If the required resources for the service path establishment are being used for the migration of other VNF of the SFC, then the process waits for the migration of the other VNF—and the following release of the migration resources—to establish the path.

Next, the node in which the packets were being buffered is changed 840 to the node with the first migrating VNF that is already running at its new location, allowing packets to be processed by the running VNFs until reaching the buffering node and avoid making the packets wait for the migration of all migrating VNFs. Finally, when all migrating VNFs have been migrated to their destinations, the packet buffering is disabled and the packet buffer flushed 842, and the SFC is set 844 as migrated.

D. FURTHER DISCUSSION

As is apparent from this disclosure, one or more embodiments may possess various useful features and attributes. Following is a non-exhaustive list of some example features and attributes.

For example, an embodiment of the invention comprises an approach for SFC migration that addresses the challenges posed by dynamic and mobility-prone environments. This approach also includes a proactive method for estimating performance issues caused by user mobility and a novel, iterative algorithm for the SFC migration. In more detail, an embodiment of the invention may implement proactive anticipation of performance issues caused by mobility—an embodiment may consider that the mobility of a user might affect the performance of ongoing services and anticipates this impact using a mobility prediction approach and service delay estimation. An embodiment of the invention may impellent iterative SFC migration focused on reduced cost—the iterative characteristic of an embodiment enables migrating only the needed VNFs to solve the mobility-caused performance issues, instead of migrating the whole SFC, which reduces the resource utilization. An embodiment may also find suitable nodes and migration paths for each VNF, choosing a plan that incurs in shorter migration delay. Finally, an embodiment may implement the migration of multiple VNFs in a dynamic environment—for example, an embodiment considers that multiple VNFs might be migrated at the same time, in a dynamic environment where SFC migrations and placements can occur during a migration procedure—thus, an embodiment may operate to orchestrate the necessary resource reservation and state migration procedure to avoid concurrence of VNF migrations within the same SFC and with other SFC placement and migration. Following are further details concerning some of these aspects of one or more embodiments of the invention.

D.1 Proactive Anticipation of Performance Issues Caused by Mobility

In a dynamic environment, where users can move from one location to another, ongoing services are prone to delay variations due to the distance between the service and the served user. Since service requirements must be satisfied despite these variations, it might be necessary to detect possible performance issues beforehand and act accordingly to avoid the deterioration of service's QoS and SLA violations. Thus, an embodiment of the invention comprises a mobility-aware approach that utilizes multiple Markov chains to predict the next movement of a user based on historical data and estimates possible maximum service delay violations at the current and predicted locations. In this way, an embodiment of the invention proactively identifies performance issues and triggers migrations to avoid or reduce the impact introduced by user's movements.

D.2 Iterative SFC Migration Focused on Reduced Cost

The SFC migration is a challenging task due to the several constraints related to where the VNF must be migrated to in order to improve the service performance, including the recipient node and migration path resource restrictions.

Besides this complexity related to the effectiveness and feasibility of an SFC migration solution, another important aspect to be considered is how efficient the migration is. Migrating SFCs impact the availability of resources in the environment, since nodes and links are used in the process. Also, while a service is being migrated, packets might need to wait to be processed until the required VNFs finish their migrations. Therefore, migration algorithms must not only find a feasible plan but also address these efficiency requirements.

A migration procedure according to one embodiment of the invention comprises an iterative approach focusing on finding the migration plan that can solve the identified performance issue by migrating the fewest possible number of VNFs of the SFC, selecting the ones that result in higher delay gains. After finding suitable destinations and paths for the migrating VNFs, the migration algorithm also considers the cost of migration in terms of the time required to migrate all VNFs, choosing the strategy that incurs in the fastest SFC migration.

D.3 Migration of Multiple VNFs in a Dynamic Environment

During the system operation, the available resources of the underlying infrastructure might vary over time. These resource changes might occur due to new SFCs being placed to serve user requests or by ongoing SFC migrations. Therefore, it is necessary to address the resource concurrency issues that may arise from these simultaneous operations when a migration is taking place. A migration mechanism according to one embodiment of the invention addresses these issues by reserving the required resources before starting the migration. This strategy avoids problems related to the unavailability of a needed resource of a node or link that composes the migration plan during its execution.

This migration mechanism of an embodiment of the invention also manages the resource concurrency that might occur between VNF migrations of the same SFC. First, during the migration decision phase, the mechanism considers the resource required by a previous VNF migration decision when deciding which node and path should be used for the migration of the next VNF, avoiding bottlenecks that would occur when several VNFs uses the same migration path. Second, during the VNF migration execution, a migrating VNF that requires a resource in use by the migration of other VNFs to establish its service path will wait for the resource to become available.

Finally, the support for stateful VNFs is also provided by an SFC migration algorithm according to an embodiment of the invention. In particular, the algorithm identifies when the migration of the state of a VNF should start, establishing conditions to synchronize the state migrations of the VNFs and reduce the buffering overhead of packets. The algorithm also elects the node responsible for buffering the packets of a service as migrating VNFs become ready, allowing packets to be processed by the VNFs that already have finished their migration, which also contributes to reducing the time that a packet waits in the buffer.

E. EXAMPLE METHODS

It is noted with respect to the disclosed methods, including the example methods of FIGS. 3-8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

F. FURTHER EXAMPLE EMBODIMENTS

Following are some further example embodiments of the invention. These are presented only by way of example and are not intended to limit the scope of the invention in any way.

Embodiment 1. A method, comprising: predicting, for a user that consumes communication network resources, a next expected position of the user in a communication network; determining that a service function chain (SFC) request by the user must be migrated from a current node in order to resolve an identified performance problem of services in the SFC; determining which virtual network function(s) (VNF) of the SFC should be migrated to resolve the performance problem, and the determining is based on a target service chain path that is shorter than a current service chain path used by the VNF(s); determining a best migration plan for the VNF(s) for resolving the identified performance problem, and the best migration plan comprises a migration path with a shortest migration delay; finding, in a service chain path identified in the best migration plan, one or more candidate target nodes for migration of the VNF(s), and identifying a target node with adequate resources to support the VNF(s); and migrating the VNF(s) from the current node to the target node with the adequate resources.

Embodiment 2. The method as recited in any preceding embodiment, wherein migrating of the VNF(s) resolves the performance problem.

Embodiment 3. The method as recited in any preceding embodiment, wherein Markov chains are used to represent, and predict, mobility of the user in the communications network, and the Markov chains include a second order Markov chain, a generic second order Markov chain, and a generic first order Markov chain.

Embodiment 4. The method as recited in any preceding embodiment, wherein migrating the VNF(s) is based on maintaining a service delay of the SFC within a maximum permissible delay specified by a service level agreement (SLA).

Embodiment 5. The method as recited in any preceding embodiment, wherein a number of VNF(s) migrated is a minimum number of VNF(s) needed to resolve the performance problem.

Embodiment 6. The method as recited in any preceding embodiment, wherein determining which VNF(s) should be migrated is based on an expected gain that comprises a difference between a service delay of a current service path used by the VNF(s) and an estimated delay of a shortest service path.

Embodiment 7. The method as recited in any preceding embodiment, wherein an iterative process is used to determine which VNF(s) should be migrated.

Embodiment 8. The method as recited in any preceding embodiment, wherein when the target node is identified, the resources associated with the target node are reserved, and a migration path found between the current node and the target node.

Embodiment 9. The method as recited in any preceding embodiment, wherein the best migration plan is one of a group of migration plans that are able to resolve the performance problem.

Embodiment 10. The method as recited in any preceding embodiment, wherein multiple VNFs are migrated to the target node.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
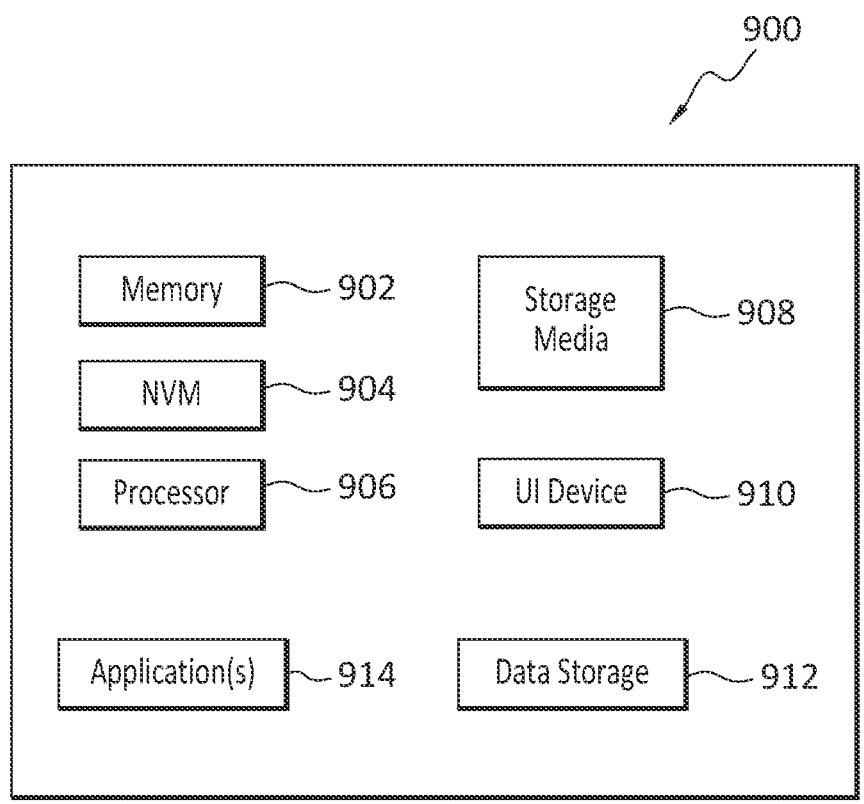
FIG. 9 discloses an example computing entity configured and operable to perform any of the disclosed methods, processes, steps, operations, and algorithms.

With reference briefly now to FIG. 9, any one or more of the entities disclosed, or implied, by FIGS. 1-8, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
upon reception of a prediction request from a user, determining whether or not historical data regarding mobility of the user is available;
in a case where it is determined that the historical data is available, predicting, for the user that consumes communication network resources, a next expected position of the user in a communication network by using a first Markov chain, in which the next expected position depends on a first number of past states;
in a case where it is determined that the historical data is not available, predicting the next expected position of the user in the communication network by using a second Markov chain, the next expected position depends on a second number of past states, wherein the second number is greater than or equal to one and less than the first number;
determining that a service function chain (SFC) request by the user must be migrated from a current node in order to resolve an identified performance problem of services in the SFC;
determining which virtual network function(s) (VNF) of the SFC should be migrated to resolve the performance problem, and the determining is based on a target service chain path that is shorter than a current service chain path used by the VNF(s);
determining a best migration plan for the VNF(s) for resolving the identified performance problem, and the best migration plan comprises a migration path with a shortest migration delay;
finding, in a service chain path identified in the best migration plan, one or more candidate target nodes for migration of the VNF(s), and identifying a target node with adequate resources to support the VNF(s); and
migrating the VNF(s) from the current node to the target node with the adequate resources.

2. The method as recited in claim 1, wherein migrating of the VNF(s) resolves the performance problem.

3. The method as recited in claim 1, wherein the first and second Markov chains are used to represent, and predict, mobility of the user in the communications network, and the first and second Markov chains include a second order Markov chain, a generic second order Markov chain, and a generic first order Markov chain.

4. The method as recited in claim 1, wherein migrating the VNF(s) is based on maintaining a service delay of the SFC within a maximum permissible delay specified by a service level agreement (SLA).

5. The method as recited in claim 1, wherein a number of VNF(s) migrated is a minimum number of VNF(s) needed to resolve the performance problem.

6. The method as recited in claim 1, wherein determining which VNF(s) should be migrated is based on an expected gain that comprises a difference between a service delay of a current service path used by the VNF(s) and an estimated delay of a shortest service path.

7. The method as recited in claim 1, wherein an iterative process is used to determine which VNF(s) should be migrated.

8. The method as recited in claim 1, wherein when the target node is identified, the resources associated with the target node are reserved, and a migration path found between the current node and the target node.

9. The method as recited in claim 1, wherein the best migration plan is one of a group of migration plans that are able to resolve the performance problem.

10. The method as recited in claim 1, wherein multiple VNFs are migrated to the target node.

11. A non-transitory storage medium having stored therein instructions that are executable by one or more hardware processors to perform operations comprising:
upon reception of a prediction request from a user, determining whether or not historical data regarding mobility of the user is available;
in a case where it is determined that the historical data is available, predicting, for the user that consumes communication network resources, a next expected position of the user in a communication network by using a first Markov chain, in which the next expected position depends on a first number of past states;
in a case where it is determined that the historical data is not available, predicting the next expected position of the user in the communication network by using a second Markov chain, the next expected position depends on a second number of past states, wherein the second number is greater than or equal to one and less than the first number;
determining that a service function chain (SFC) request by the user must be migrated from a current node in order to resolve an identified performance problem of services in the SFC;
determining which virtual network function(s) (VNF) of the SFC should be migrated to resolve the performance problem, and the determining is based on a target service chain path that is shorter than a current service chain path used by the VNF(s);
determining a best migration plan for the VNF(s) for resolving the identified performance problem, and the best migration plan comprises a migration path with a shortest migration delay;
finding, in a service chain path identified in the best migration plan, one or more candidate target nodes for migration of the VNF(s), and identifying a target node with adequate resources to support the VNF(s); and
migrating the VNF(s) from the current node to the target node with the adequate resources.

12. The non-transitory storage medium as recited in claim 11, wherein migrating of the VNF(s) resolves the performance problem.

13. The non-transitory storage medium as recited in claim 11, wherein the first and second Markov chains are used to represent, and predict, mobility of the user in the communications network, and the first and second Markov chains include a second order Markov chain, a generic second order Markov chain, and a generic first order Markov chain.

14. The non-transitory storage medium as recited in claim 11, wherein migrating the VNF(s) is based on maintaining a service delay of the SFC within a maximum permissible delay specified by a service level agreement (SLA).

15. The non-transitory storage medium as recited in claim 11, wherein a number of VNF(s) migrated is a minimum number of VNF(s) needed to resolve the performance problem.

16. The non-transitory storage medium as recited in claim 11, wherein determining which VNF(s) should be migrated is based on an expected gain that comprises a difference between a service delay of a current service path used by the VNF(s) and an estimated delay of a shortest service path.

17. The non-transitory storage medium as recited in claim 11, wherein an iterative process is used to determine which VNF(s) should be migrated.

18. The non-transitory storage medium as recited in claim 11, wherein when the target node is identified, the resources associated with the target node are reserved, and a migration path found between the current node and the target node.

19. The non-transitory storage medium as recited in claim 11, wherein the best migration plan is one of a group of migration plans that are able to resolve the performance problem.

20. The non-transitory storage medium as recited in claim 11, wherein multiple VNFs are migrated to the target node.

* * * * *